United States Patent [19]

Goclowski

[11] Patent Number: 5,580,117
[45] Date of Patent: Dec. 3, 1996

[54] ATTACHABLE AND EXTENDIBLE SUN VISOR FOR INCREASED AND CONVENIENT SUN PROTECTION IN AN AUTOMOBILE

[76] Inventor: Keith M. Goclowski, 88 Bittersweet Cr., Guilford, Conn. 06437

[21] Appl. No.: 444,840
[22] Filed: May 18, 1995
[51] Int. Cl.⁶ ........................................ B60J 3/02
[52] U.S. Cl. ............... 296/97.6; 296/97.9; 296/97.13
[58] Field of Search .................... 296/97.6, 97.8, 296/97.9, 97.11–97.13

[56] References Cited

U.S. PATENT DOCUMENTS

| 1,275,311 | 8/1918 | Humacher et al. | 296/97.4 |
|---|---|---|---|
| 1,772,233 | 8/1930 | Vivier | 296/97.11 X |
| 2,212,007 | 8/1940 | Buchanan | 296/97.6 |
| 2,965,416 | 12/1960 | Dryden | 296/97.8 |
| 3,201,170 | 8/1965 | Weingarten | 296/97.6 |
| 3,679,255 | 7/1972 | Nacarato | 296/97.6 |
| 4,690,451 | 9/1987 | Killar | 296/97.8 X |
| 4,703,972 | 11/1987 | Omberg | 296/97.12 |
| 4,950,021 | 8/1990 | Vandagriff | 296/97.6 |
| 5,244,244 | 9/1993 | Gute | 296/97.9 X |
| 5,306,065 | 4/1994 | Ades | 296/97.6 |

FOREIGN PATENT DOCUMENTS

| 82968 | 6/1957 | Denmark | 296/97.12 |
|---|---|---|---|
| 652906 | 3/1929 | France | 296/97.11 |
| 154382 | 7/1932 | Switzerland | 296/97.9 |
| 696429 | 9/1953 | United Kingdom | 296/97.12 |

Primary Examiner—Dennis H. Pedder
Attorney, Agent, or Firm—Scott B. Garrison; Gary E. Lambert

[57] ABSTRACT

An adjustable and extendible secondary sun visor which is attachable to the pre-existing sun visor of a vehicle. The secondary sun visor is releasably attached to a pre-existing sun visor by a clip. The secondary visor is connected to the clip by a movable arm which allows for motion and rotation in four different positions, and which allows the user thereof to place the secondary visor in any desired position along the windshield of a vehicle. The secondary visor further allows the user to extend the area of protection by a slide. When in a stored position, secondary visor is located underneath a pre-existing visor, which allows for easy and convenient placement during non-use.

5 Claims, 6 Drawing Sheets 5,580,117

ATTACHABLE AND EXTENDIBLE SUN VISOR FOR INCREASED AND CONVENIENT SUN PROTECTION IN AN AUTOMOBILE

BACKGROUND OF THE INVENTION

The instant invention relates generally to motor vehicle sun visor attachments and, more particularly, to a multi-adjustable sun visor adapted to be attached to a pre-existing visor in a vehicle to provide a variety of adjustments.

Effective sun-shading equipment is obviously of utmost importance for optimum driving conditions. To that end, sun visors have long been part of standard motor vehicle equipment. Moreover, a variety of sun shading structures have been developed to provide additional protection from sun glare for both drivers and passengers. Some representative examples of these structures are disclosed in U.S. Pat. Nos. to Karford (4,792,176), Jasso (4,913,483), Vu et al (4,982, 992), Vandergriff (4,950,021) and Ades (5,306,065).

The Kafford structure is a visor extension unit with a laterally slidable panel and a downwardly slidable panel contained therein. When shading is needed at the side window of the driver or front-seat passenger, the existing sun visor must be pivoted along with the attached visor extension unit to the side window, leaving the front windshield area open to sun glare.

The Jasso structure is merely a glare shield, removably clippable to an existing sun visor. The glare shield is basically designed to intercept sun rays when the existing sun visor is not in use.

The Vandagriff structure is an adjustable sun visor unit attachable to an existing sun visor for use either at the front windshield or at a side window of the driver or front-seat passenger. This unit has a divisible, laterally movable, upper panel with an attached supplementary lower panel. The visors of the unit are not able to be moved independently of each other.

The Ades structure provides for simultaneous shading of the front and side window, however, it only allows for limited longitudinal, vertical and angular circular adjustment and then only if employed in the less preferred alternative embodiment.

None of the above-described supplemental units provides features for simultaneously shading of the front windshield or a side window of the driver or a front-seat passenger while allowing for complete longitudinal, vertical and angular circular adjustment of the supplemental unit. Furthermore, none of the above-mentioned units employ the use of a ball and socket in combination with a rotating hinge to accomplish the subject movement, further incorporating a lateral extension, which is simple to use and easy to manufacture. Additionally, none of the above-mentioned inventions allow for angular movement of the sun visor directly in front of the driver or passenger without movement of the sun visor to the left of the driver or right of the passenger, respectively.

Consequently, a need exists for an attachable and extendible visor attachment which provides for simultaneous shading of both the front windshield and a side window for a driver or from-seat passenger which can be longitudinally, vertically, angularly, circularly, and laterally adjusted independently from the existing sun visor. The unit should be simple in design and construction for inexpensive manufacture and for ease in use by a driver or passenger in a vehicle.

SUMMARY OF THE INVENTION

The present invention provides an attachable and extendible sun visor designed to satisfy the aforementioned need by avoiding the drawbacks of the prior art without introducing other drawbacks. Instead, the assembly of the present invention provides expanded capabilities not available in the prior art devices.

One capability is the simplicity in design and construction of the assembly for inexpensive manufacture and for ease in use by either a driver or front-seat passenger in a vehicle.

A second capability is the simultaneous shading coverage provided at both the front windshield and a side window by the attachable and extendible sun visor.

A third capability is the additional lateral shading coverage provided by the extension panel of the device.

A fourth capability is the ability to fix the device in a plurality of spaced angular positions both in from of and to the side of the driver or passenger of a vehicle.

A fifth capability is the ease of storing the device when not in use, since the invention rests below a pre-existing sun visor when in a stored position and is not sandwiched between a pre-existing sun visor and the inside roof of a vehicle, as is the case with those devices of the prior art.

A sixth capability is the independent movement of each of the respective visors when used in combination with each other.

These and other capabilities are preferably accomplished by providing an attachable and extendible sun visor which can be clipped on to the pre-existing sun visor of a vehicle. The attachable and extendible sun visor releasably attaches to the pre-existing sun visor and is adjustable both longitudinally, downwardly and in a circular relationship to the pre-existing visor. This attachable sun visor includes a panel section that can be swung away from the mounting of the of the attachable sun visor to the pre-existing sun visor. Additionally, the attachable sun visor incorporates the use of a ball and socket in combination with a rotating hinge which allows the attachable sun visor to be moved into any position desired by the user.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

DETAILED DESCRIPTION OF THE PREFERRED EMBODIMENT

Figure 1:
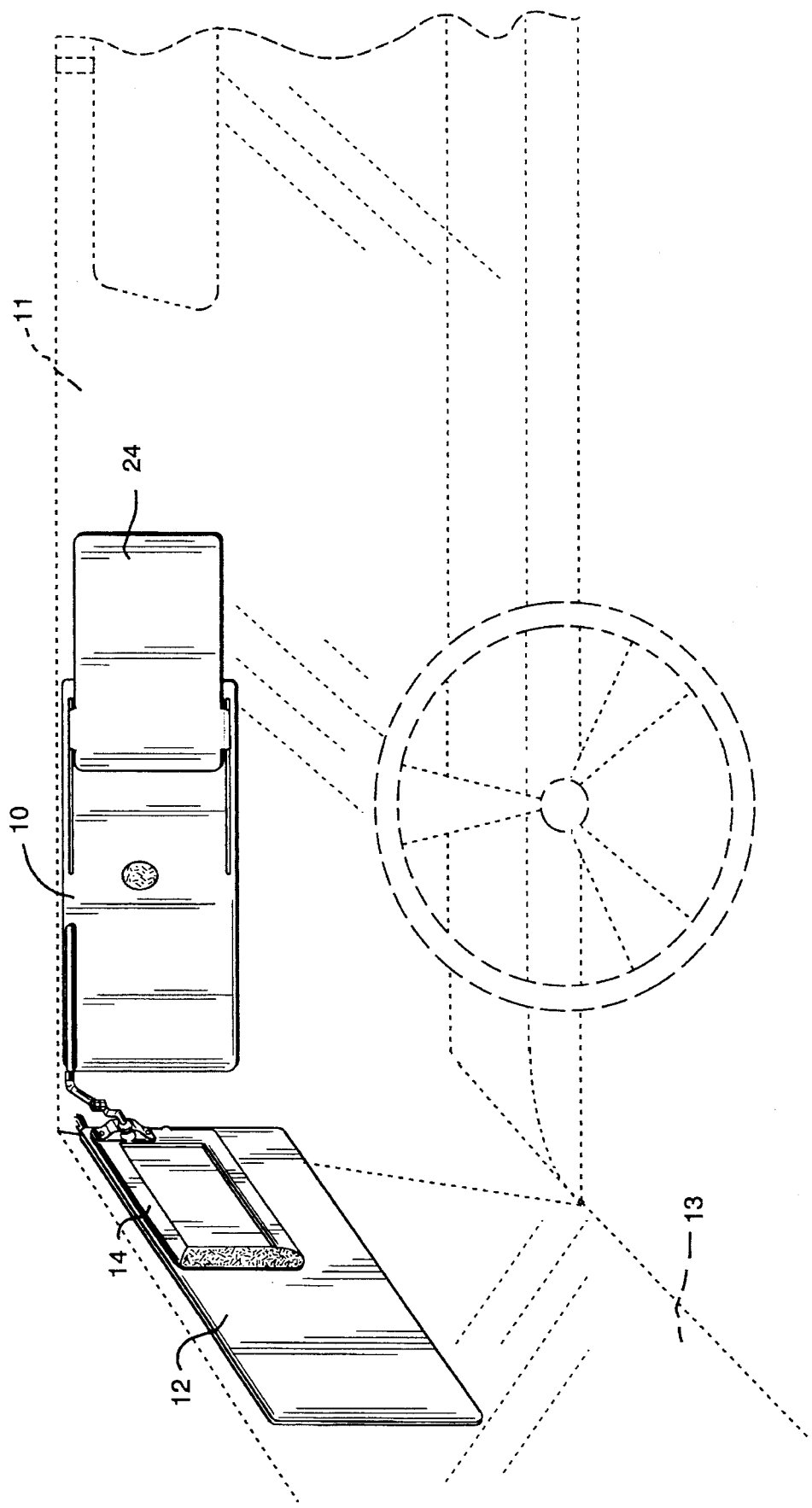
FIG. 1 illustrates the invention in an attached, open and extended position on a pre-existing sun visor in the driver's portion of a motor vehicle where the pre-existing sun visor is placed along the top of the left side window and the invention is placed along the top of the windshield.

Referring now to FIG. 1, a typical application of the invention is illustrated wherein the secondary visor 10 is opened across the top of the front window 11 in an extended position and pre-existing visor 12 is opened across the top of the side window 13 of a vehicle.

Figure 2:
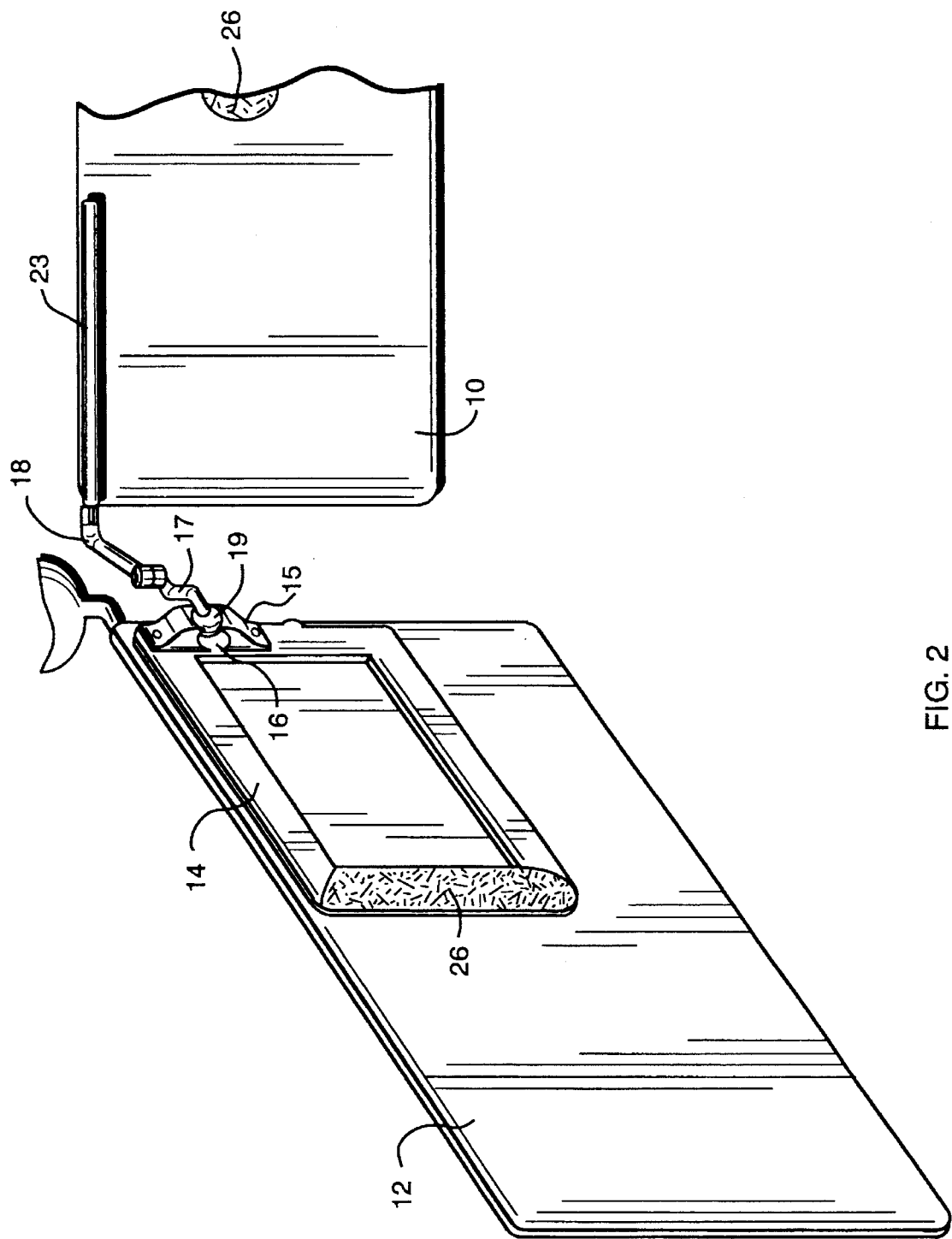
FIG. 2 is a perspective view of the invention in an open and attached position.

As shown in FIG. 2, the invention is attached to a pre-existing visor 12 by a resiliently flexible clip 14 which is attached generally parallel to the latitudinal axis of pre-existing visor 12. Clip 14 is releasably securable over the side edge portion of visor 12 in order to releasably secure the invention to visor 12. Rigidly attached to clip 14 is socket 15 which is comprised of two parts and, when attached to clip 14 in the manner shown, forms an inner circular portion 16.

Figure 6A:
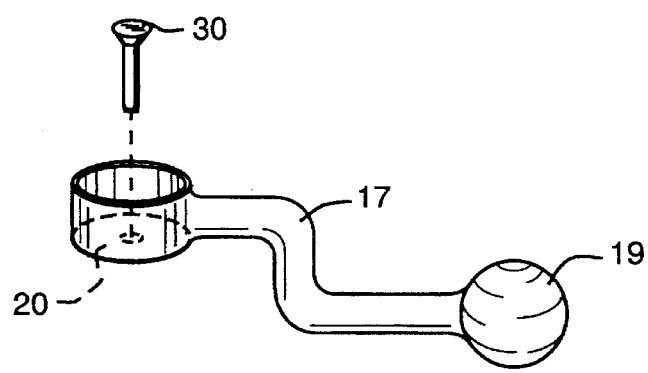
FIG. 6a is a perspective view of a first arm containing a ball on one end and a portion of a moving hinge on the other.
Figure 6B:
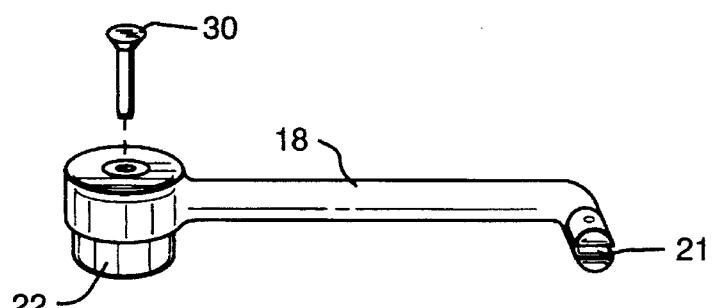
FIG. 6b is a perspective view of a second arm containing a slot on one end and a portion of a moving hinge on the other.

FIGS. 6a and 6b show a first arm 17 and second arm 18 respectively. As shown, first arm 17 is comprised of a ball 19 at one end and a circular hollow shell 20 at the other end. Second arm 18 is comprised of a slot 21 at one end and circular insert 22. Circular insert 22 is placed within circular hollow shell 20 and movably secured to shell 20 by any known securing device, in this case a pin 30, to form a moving hinge so that, although attached, first arm 17 and second arm 18 are movable in relation to each other.

Figure 3A:
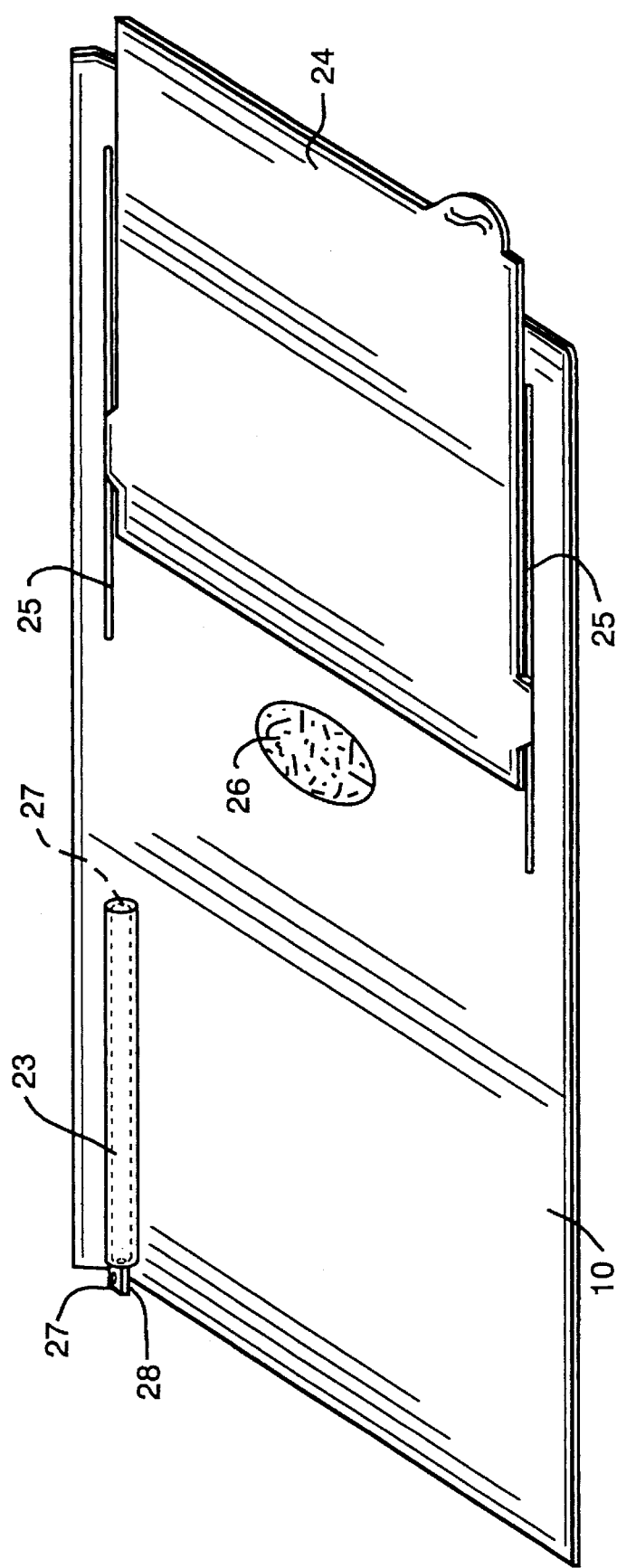
FIG. 3a is a front, perspective, elevational view of the secondary visor of the invention.

FIG. 3a shows how secondary visor 10 contains visor hinge 23. Although securely attached to secondary visor 10, visor hinge 23 contains a cylinder 27 which is able to rotate 360 degrees within hinge 23 yet is movably encased by hinge 23. One end of cylinder 27 contains a rib 28 which fits within slot 21 of arm 18 in order to connect arm 18 with visor hinge 23, as is shown in FIG. 2. Additionally, visor 10 contains a slide 24 along grooves 25 which allows slide 24 to be extended in a lateral position when desired by the user so as to block more sun or glare from front window 11. In a preferred embodiment of the invention, a strip of Velcro 26 would be placed on secondary visor 10 and clip 14 so as to allow visor 10 and clip 14 to be securely fastened to each other when the invention is not in use.

Figure 3C:
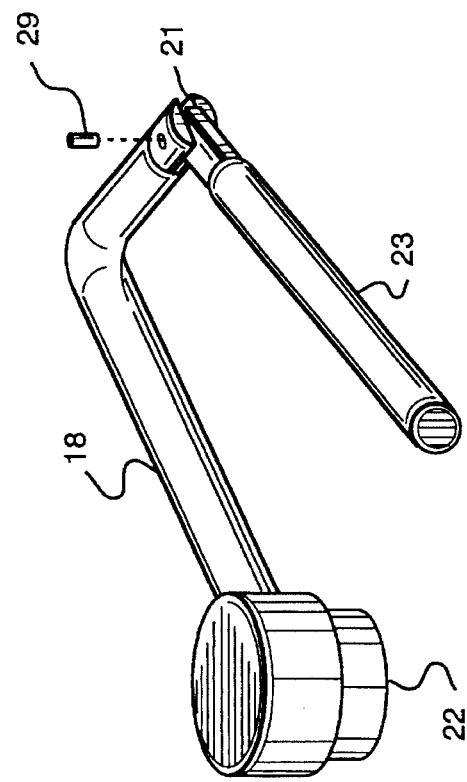
FIG. 3c is a perspective view of the second arm and its attachment to the cylinder of the visor hinge when the hinge is rotated with respect to the second arm.
Figure 3B:
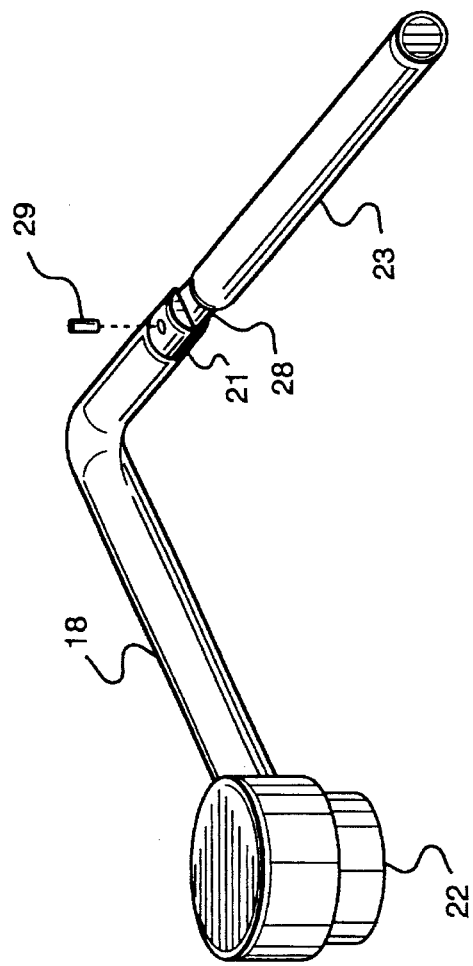
FIG. 3b is a perspective view of the second arm and its attachment to the cylinder of the visor hinge.
Figure 4A:
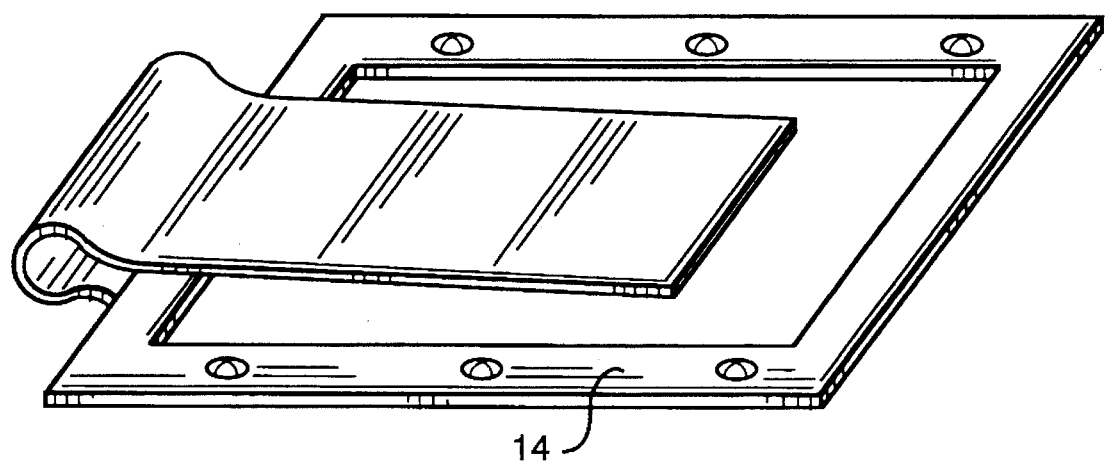
FIGS. 4a and 4b are front and back perspective views, respectively, of the clip used to attach the invention to a pre-existing sun visor.
Figure 4B:
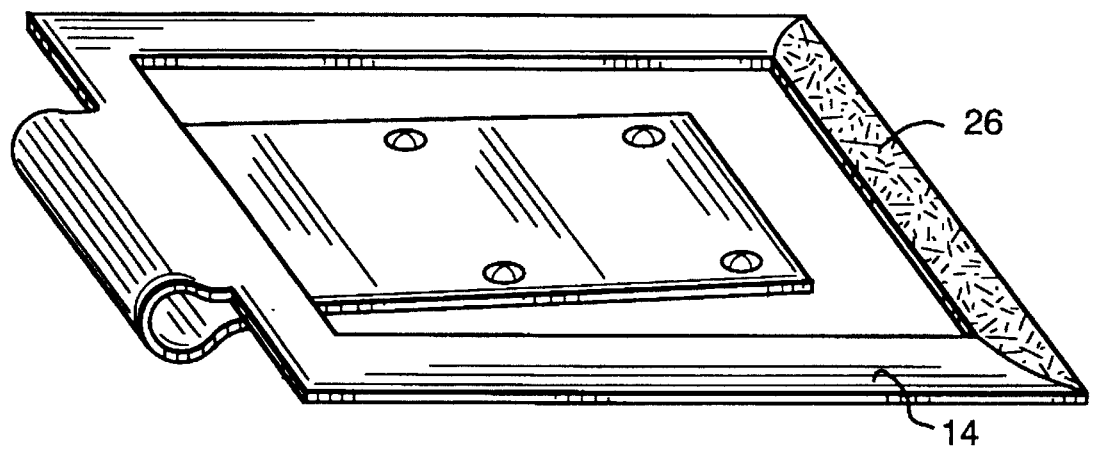

FIGS. 3b and 3c depict the movement between arm 18 and cylinder 27 of hinge 23. As can be seen, the use of a connecting pin 29 through the holes of slot 21 and rib 28 when they are joined allows for the lateral movement of secondary visor 10 in relation to pre-existing visor 12.

Figure 5:
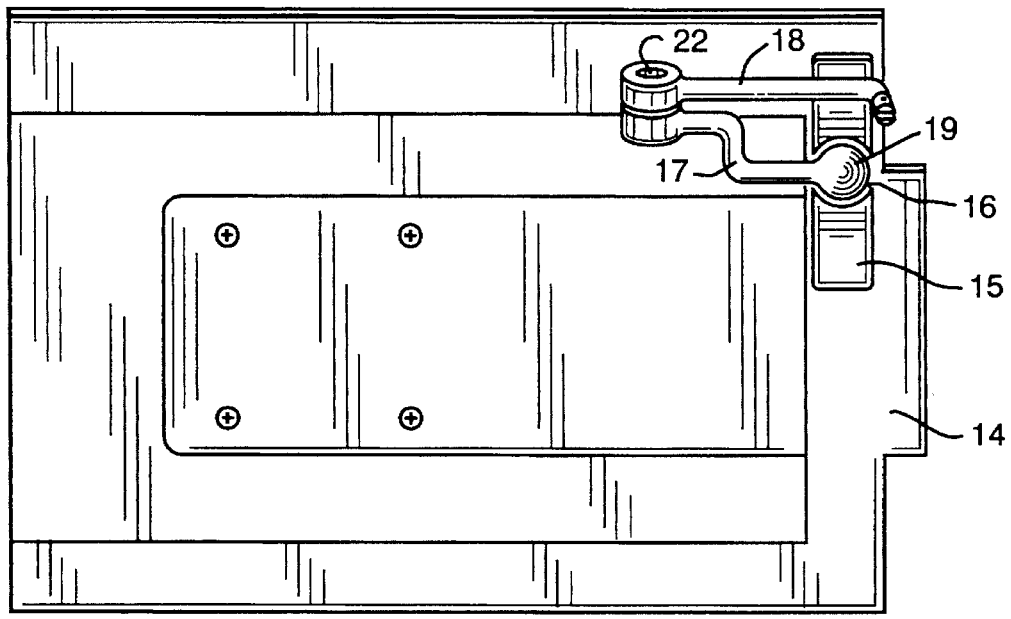
FIG. 5 is a front elevational view of the invention in a closed storage position without the secondary visor.

As can be seen from FIGS. 2 and 5, ball 19 is placed within inner circular portion 16 of socket 15 and slot 21 of second arm 18 is attached to visor hinge 23 of secondary visor 10. As can best be seen in FIG. 5, ball 19 and socket 15, working in conjunction enable the first arm to rotate at least 180 degrees in a first plane which is perpendicular to the pre-existing sunvisor and less than 90 degrees in a plane perpendicular to the first plane. In this manner, and by use of the manual movement of ball 19 within circular portion 16, interaction of circular shell 20 with circular insert 22, 360 degree rotation of visor hinge 23, and the lateral movement of slot 21 in relation to rib 28, the invention is capable of blocking sun or glare from any position which the user may desire, without movement of both visors at the same time if not desired.

I claim:

1. An attachable and extendible sun visor comprising:

a clip for attachment to a pre-existing sun visor;

a secondary visor, said secondary visor containing a visor hinge securely attached to said secondary visor, said visor hinge further comprising a cylinder movably encased within said visor hinge, said cylinder capable of 360 degree rotation with respect to said visor hinge, said cylinder further containing a rib at one end;

a first arm, said first arm rotatably mounted at a first end to said clip, said first end of said first arm containing a ball joint positioned within a receiving socket mounted to said clip, said ball joint and receiving socket provide said first arm with rotational movement comprising at least 180 degree rotational movement in a first plane, said first plane being perpendicular to said pre-existing sunvisor, and further comprising less than 90 degree rotational movement in a second plane, said second plane being perpendicular to said first plane; and a second arm, said second arm mounted at a first end to a second end of said first arm by a hinge means, said hinge means capable of rotational motion about a single axis, said second arm mounted at a second end to said secondary visor by pin means between said second end of said second arm and said rib, said placement of said pin means forming a joint, said joint is capable of rotational motion about a single axis, whereby motion of said hinge means is limited in arc from a configuration in which said first arm and said second arm are positioned adjacently abutting each other forming an angle not substantially greater than 0 degrees to a configuration in which said first arm and said second arm form an angle not substantially greater than 180 degrees.

2. An attachable and extendible sun visor as claimed in claim 1 wherein said first and said second arms each comprise at least one curve, said at least one curve enabling said first arm and said second arm acting in cooperation with said hinge means to extend parallel to one another at one end thereof.

3. An attachable and extendable sun visor as claimed in claim 2 wherein said secondary visor further comprises a sliding element, said sliding element movably attached to said secondary visor to enable a user to slidably extend said sliding means from secondary visor thereby further blocking sun glare.

4. An attachable and extendible sun visor as claimed in claim 3 wherein said clip is resilient, said resiliency enabling said clip to mountably attach to said pre-existing sun visor.

5. An attachable and extendible sun visor as claimed in claim 4 wherein said movement of said ball joint relative to said receiving socket enables pivoting of said secondary visor from a position other than parallel planar alignment between a topmost surface of said pre-existing visor and a topmost surface of said secondary visor.

* * * * *